H. S. DICKINSON.
AGRICULTURAL IMPLEMENT.
APPLICATION FILED FEB. 21, 1917.
1,316,695.
Patented Sept. 23, 1919.
8 SHEETS—SHEET 1.
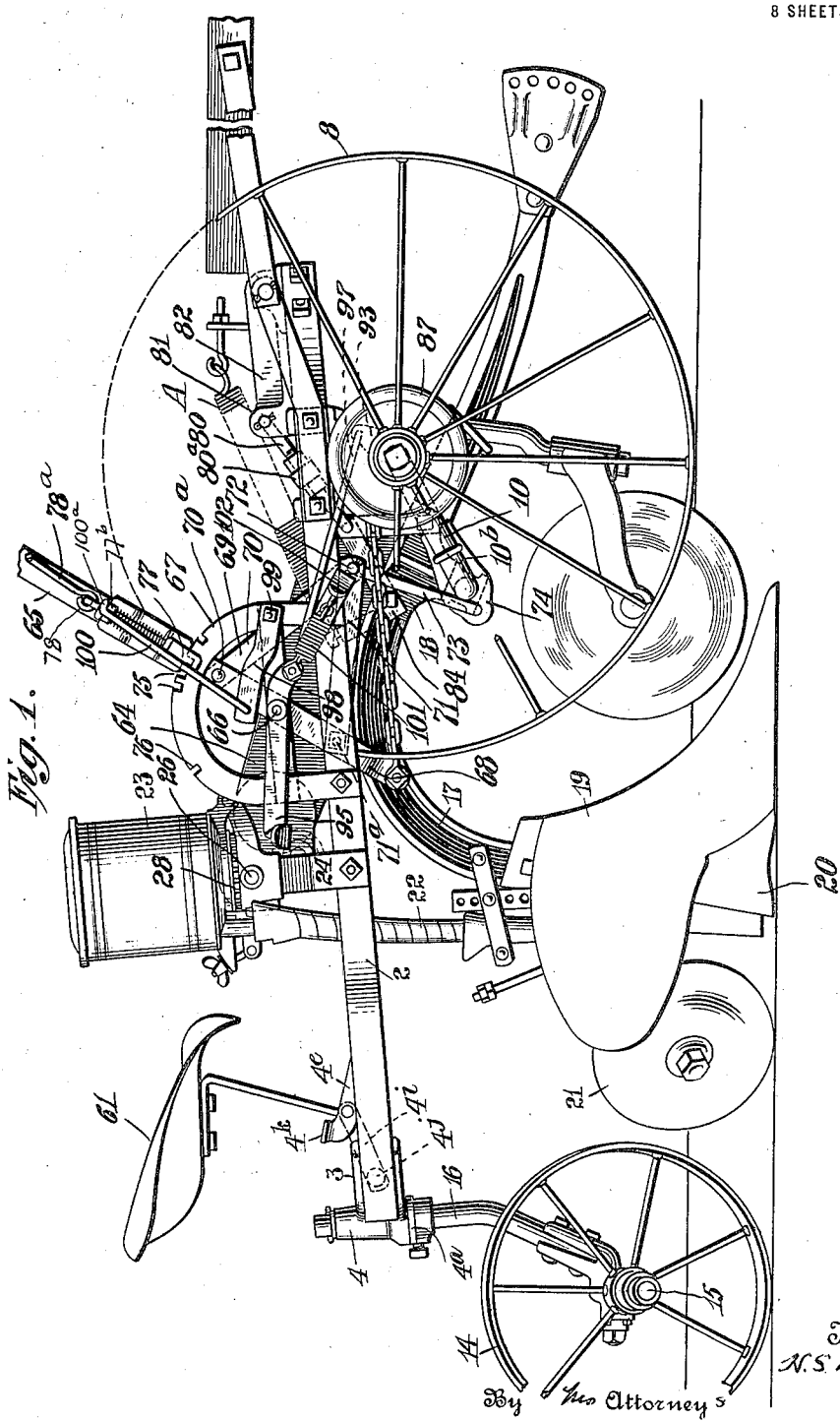
Inventor
H. S. Dickinson
By his Attorneys
Rogers, Kennedy Campbell

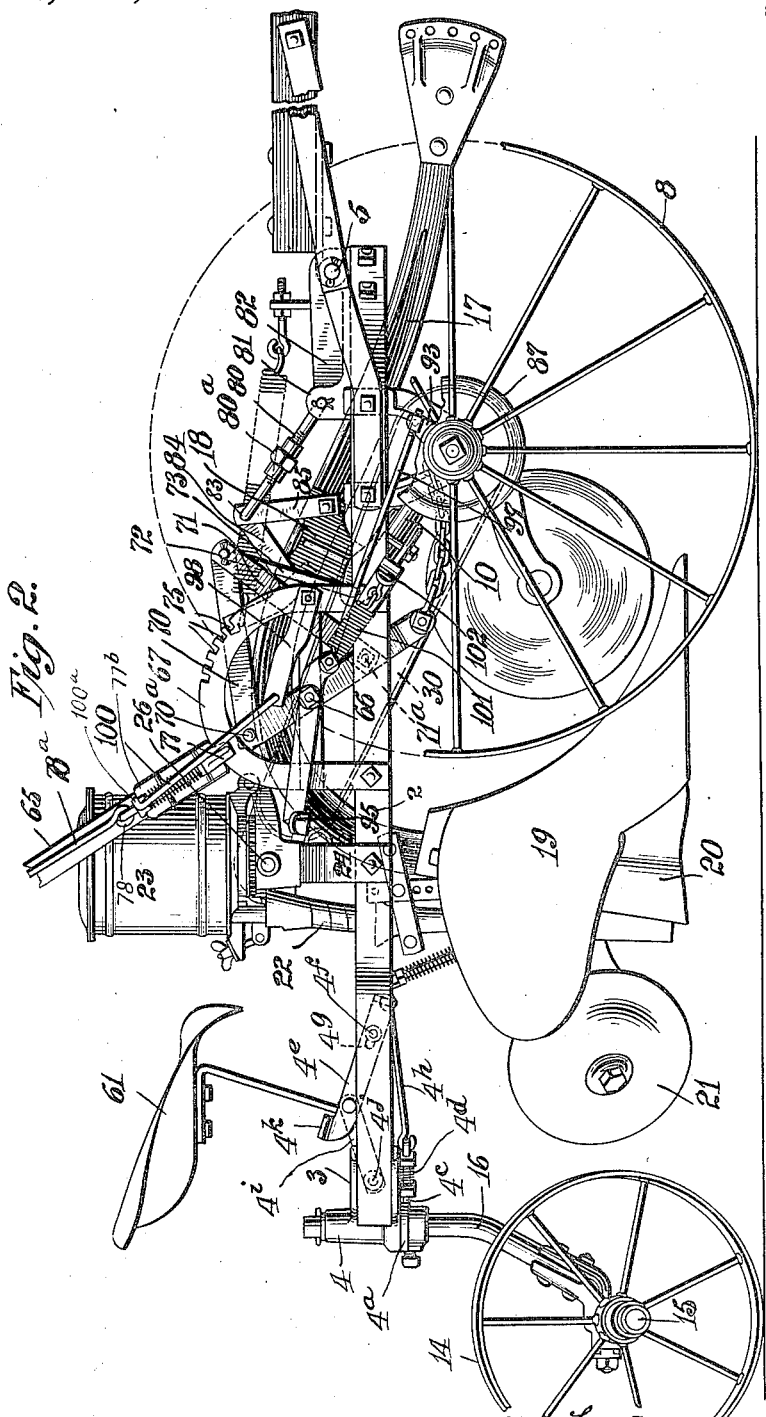

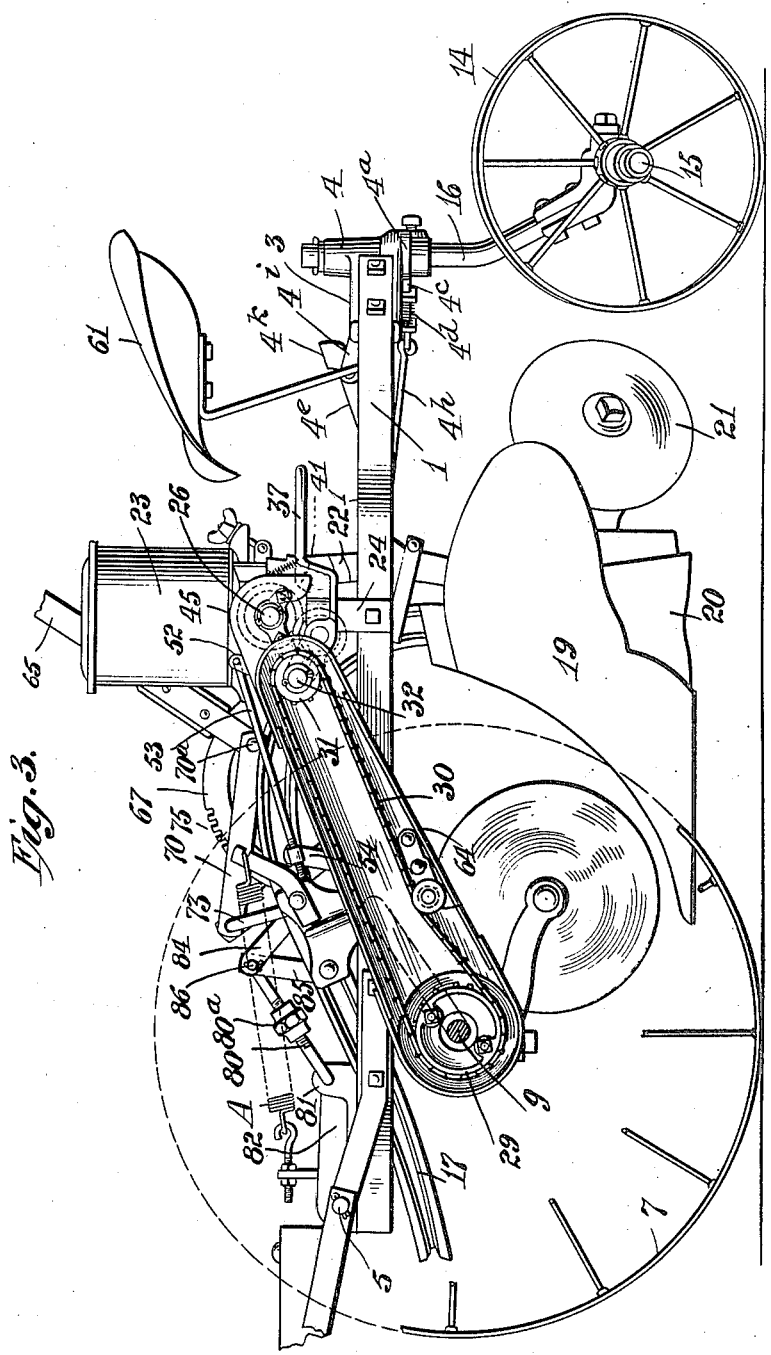

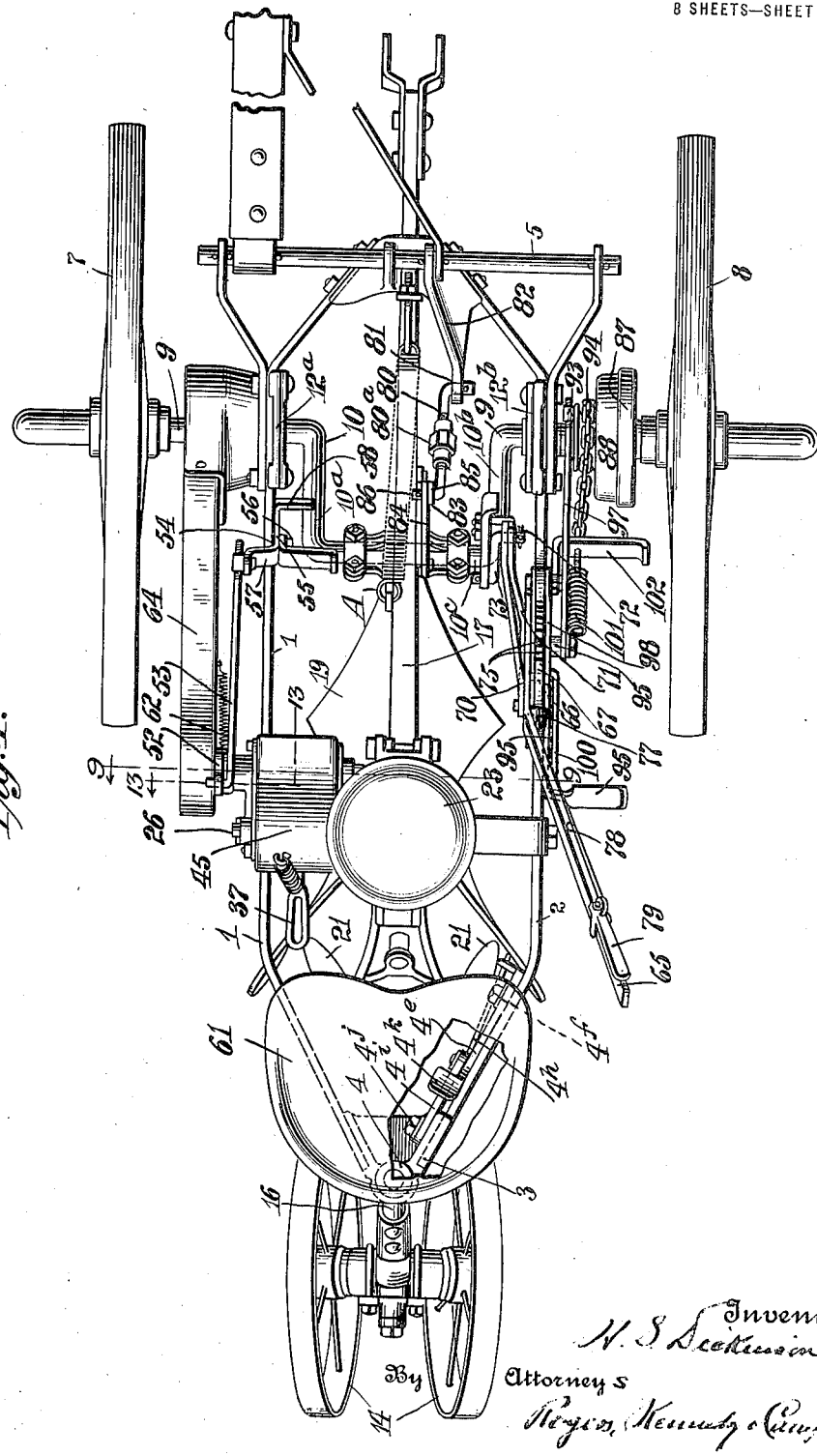

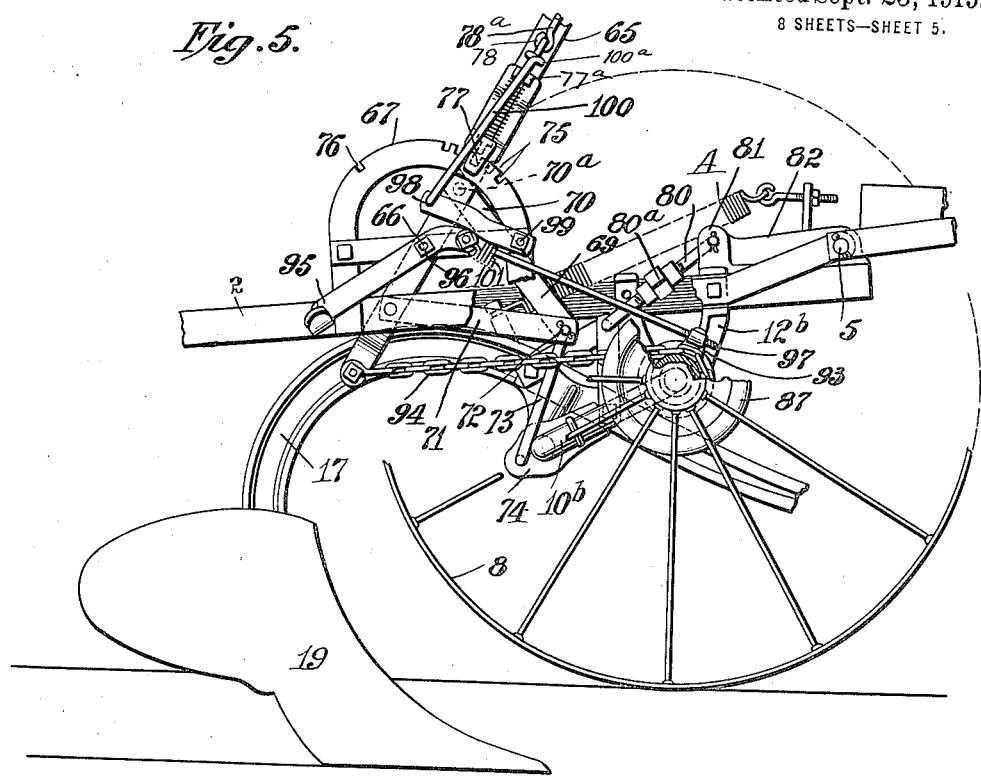

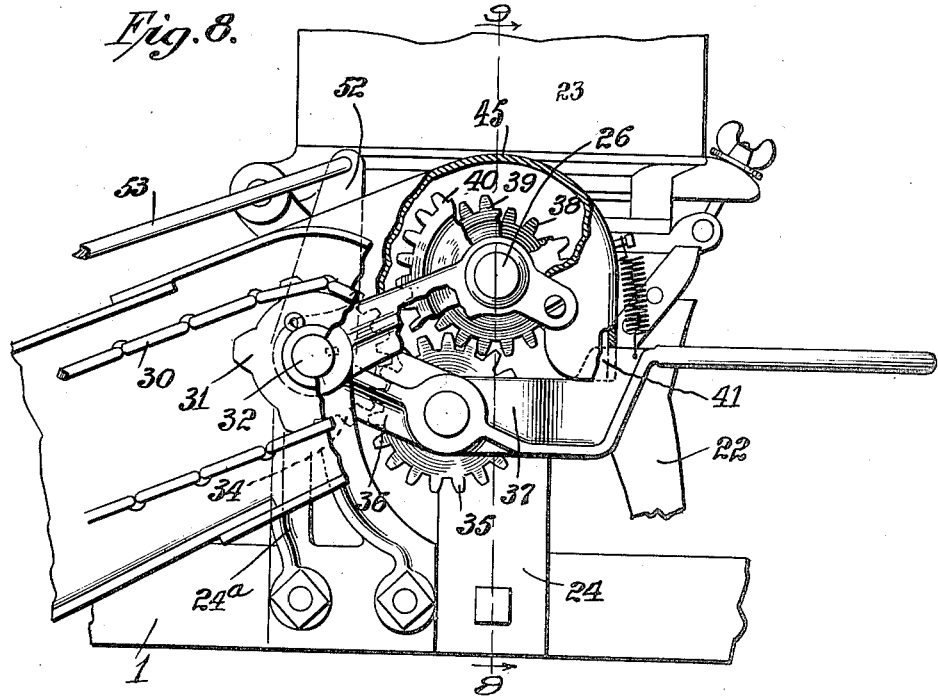
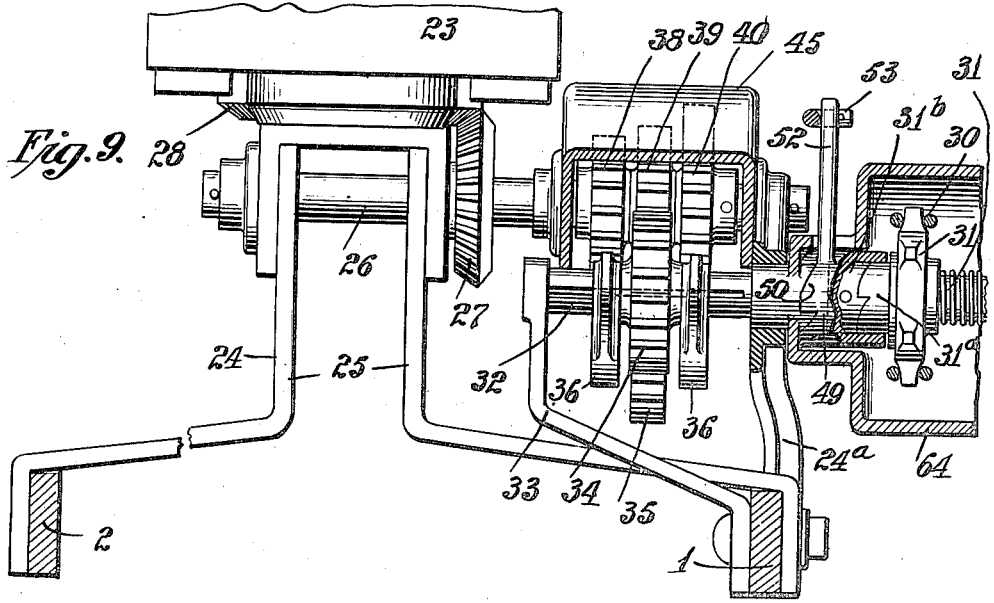

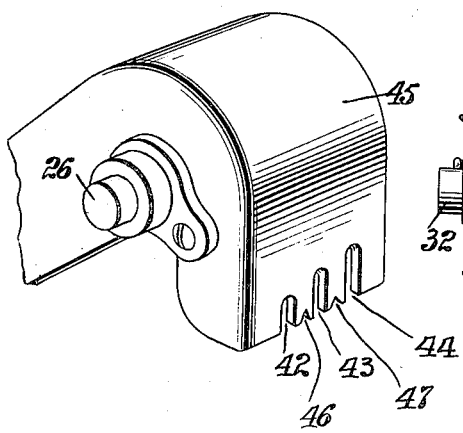
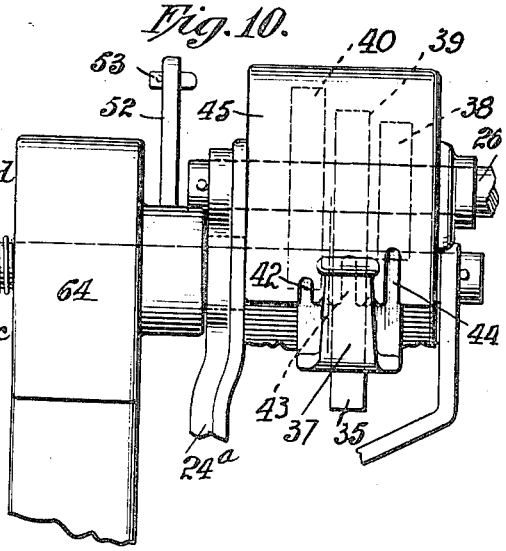
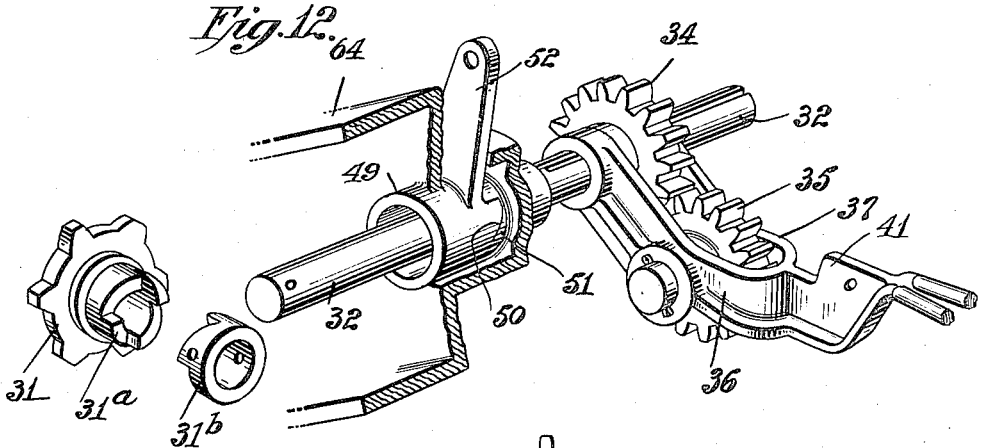
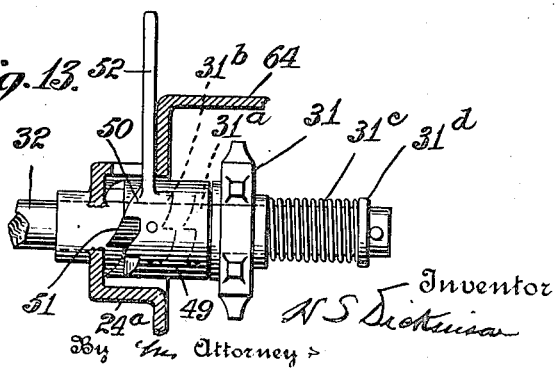

H. S. DICKINSON.
AGRICULTURAL IMPLEMENT.
APPLICATION FILED FEB. 21, 1917.

1,316,695.

Patented Sept. 23, 1919.
8 SHEETS—SHEET 8.

UNITED STATES PATENT OFFICE.

HARRY S. DICKINSON, OF MOLINE, ILLINOIS, ASSIGNOR TO MOLINE PLOW COMPANY, A CORPORATION OF ILLINOIS.

AGRICULTURAL IMPLEMENT.

1,316,695.

Specification of Letters Patent.   Patented Sept. 23, 1919.

Application filed February 21, 1917.   Serial No. 149,981.

*To all whom it may concern:*

Be it known that I, HARRY S. DICKINSON, a citizen of the United States, residing at Moline, in the county of Rock Island and State of Illinois, have invented certain new and useful Improvements in Agricultural Implements, of which the following is a specification, reference being had therein to the accompanying drawing.

This invention relates to agricultural implements and has reference more particularly to seed planters of the "single-row lister" type comprising a frame sustained at the front by ground wheels and at the rear by covering or press wheels and giving support to a furrow opener in the form of a double mold board plow, and a seed discharging mechanism, the machine operating to make a furrow in which the seed is deposited, and acting to throw up the soil at either side of the furrow so as to form alternate ridges and trenches. Owing to the fact that in these machines the double mold board plow presents an extended surface to the ground in making the necessary furrow and in throwing up the dirt, considerable difficulty is encountered in raising the plow by hand. One feature of my invention aims to overcome this difficulty, and one part of the invention consists in mechanism of improved form and construction for raising the plow by power derived from the motion of the machine through the field, the said power being taken preferably from one of the ground wheels.

A second feature of the invention consists in improved means for sustaining the furrow opener support or plow beam so that it may be raised and lowered, and adjusted to maintain its proper position when raised and lowered, and to vary the angle of the plow point to the ground according to the nature of the soil, whether hard or soft.

The invention consists also of various other improved features of construction designed to simplify the construction and operation of the machine as a whole and to render its action reliable and effective, which improvements will be fully set forth in the specification to follow and the novel parts of which will be defined in the appended claims.

In the accompanying drawings:

Figure 1 is a side elevation of a lister planter embodying my invention, and showing the machine in operation with the plow lowered.

Fig. 2 is a similar view with the plow raised.

Fig. 3 is a side elevation as viewed from the opposite side of the machine with the plow raised.

Fig. 4 is a top plan view of the machine with the parts in the position shown in Fig. 2.

Fig. 5 is a view of the front portion of the machine with the parts generally in the position they occupy in Fig. 1, but with the locking device which holds the plow down, released, preparatory to the operation of the power lifting means, certain parts of the machine being broken away to expose other parts to view.

Fig. 6 is an elevation partly in section of the clutch mechanism for controlling the action of the power lifting means, the said clutch parts being shown disengaged.

Fig. 7 is a similar view with the clutch parts engaged.

Fig. 8 is a side elevation on an enlarged scale, with parts broken away, of a portion of the machine in the vicinity of the seed discharging mechanism, the said figure showing the driving gearing for said mechanism, and the change gears for varying the intervals of deposit of the seed in the ground.

Fig. 9 is a vertical sectional elevation on an enlarged scale taken on the line 9—9 of Figs. 4 and 8, as viewed in the direction of the arrows on said figures.

Fig. 10 is a rear elevation, on an enlarged scale, of parts of the mechanism for varying the rate of seed discharge, the controlling lever for said mechanism being set at an intermediate point.

Fig. 11 is a perspective view of the inclosing casing for the change gears, showing means whereby the controlling lever may be set so as to disconnect the seed discharging mechanism from its driving gearing.

Fig. 12 is a perspective view of the parts of the seed discharge controlling mechanism separated.

Fig. 13 is a sectional elevation on an enlarged scale taken on the line 13—13 of Fig. 4, as viewed in the direction of the arrow on said line.

Figure 14:
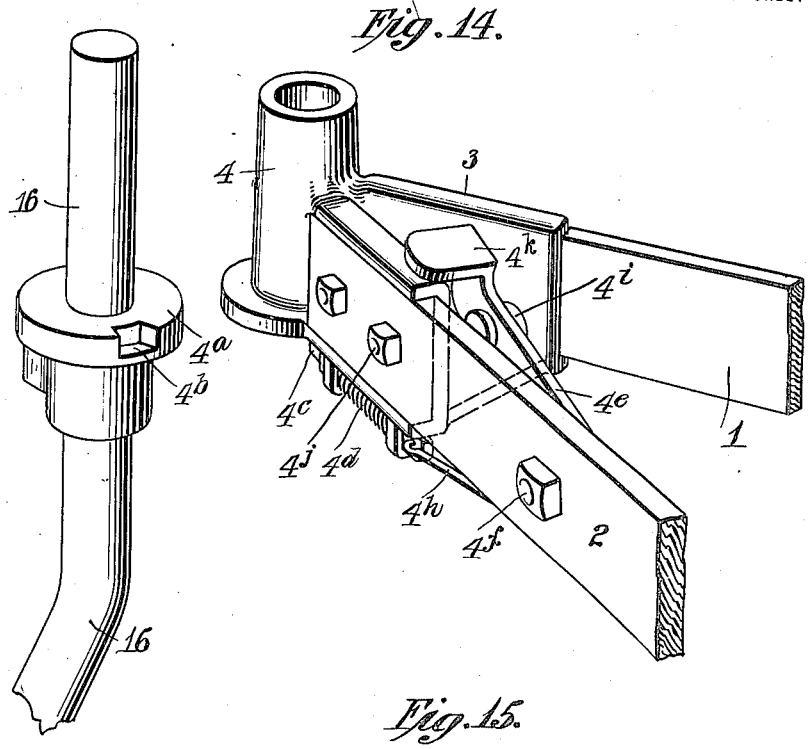
Fig. 14 is a fragmentary perspective view of the rear end of the frame of the machine and the upper end of the stem for the press wheels, the said stem being removed from its bearing in the frame.

Referring to the drawings:

The frame of the machine in the present instance consists of two horizontal fore and aft extending parallel frame bars 1 and 2 which converge at their rear ends and are connected together by a casting or block 3 provided with a vertical bearing 4 for the purpose presently to be described. The frame bars at their forward ends give support to a horizontal transverse draft bar 5 to which is connected a draft tongue.

The forward end of the frame is sustained at one side by a ground wheel 7 and at the other side by a ground wheel 8, which wheels are mounted to rotate on the horizontal axle arms 9 of an arched axle 10, the central arched portion of which, comprising the arch arms $10^a$ and $10^b$ and connecting wrist portion $10^c$, is situated between the frame bars 1 and 2, while the horizontal axle arms are mounted loosely in bearings 11 and 12 supported in brackets or hangers $12^a$ and $12^b$ depending from the two frame bars near their forward ends.

The rear end of the frame is supported by a press wheel structure comprising two press wheels 14 mounted on the ends of a horizontal axle 15 on the lower end of a vertical stem 16, the upper end of which is mounted loosely in the bearing 4 before alluded to, so that the press wheels may swivel about the vertical axis of the stem. Beneath the bearing 4 the stem has fixed to it a collar $4^a$ containing a notch $4^b$ in its periphery, which notch is adapted to receive a horizontally endwise movable locking latch $4^c$ mounted in guides on the under side of the block 3, the said latch being acted on by a spring $4^d$ which tends to thrust it rearwardly against the periphery of the collar and seat the latch in the notch. The latch and notch are so arranged with relation to the machine frame and axle 15 that when the latch is engaged in the notch, the press wheels will be held from swiveling so that they will travel in line with the path of advance of the machine. The sides of the latch are beveled and the walls of the notch are likewise beveled so that if the wheel encounters undue resistance or pressure, tending to turn the same and swivel the stem, the latch will be automatically pushed forwardly and disengaged from the notch so as to release the stem and prevent injury to the parts. Provision is made for retracting the latch to release the stem so that the wheels may caster freely, which action is effected by means of a foot lever $4^e$ pivoted near its forward end as at $4^f$ on a horizontal axis to the frame bar 2 by means of a bolt passing through the frame bar and through a longitudinal slot $4^g$ in the lever, whereby the lever is permitted to pivot on said bolt and also is capable of a limited endwise movement thereon. At its forward end the lever has connected with it a link $4^h$ which extends rearwardly and has its rear end jointed to the rear end of the latch. Near its rear end the lever has pivoted to it a second link $4^i$ which extends rearwardly and is pivoted as at $4^j$ to the block 3. Normally, with the latch seated in the notch in the collar, and held therein yieldingly by the spring, the foot lever will extend at an upward inclination and will be maintained yieldingly in this position by the latch spring. When now it is desired to release the stem to permit the press wheels to caster freely, the operator presses down on a lateral foot pad $4^k$ on the rear extremity of the lever, which action will swing the lever and link $4^h$ downwardly and at the same time will shift the lever forwardly endwise, thereby thrusting the link $4^i$ forwardly and retracting the latch and releasing the stem. The downward movement is continued until the parts "pass center" and the foot pad brings up against the upper edge of the link $4^h$, in which position the parts will be locked and the latch held free of the collar on the stem. When the latch is to be rendered active again in order to lock the stem, the driver lifts the foot pad upwardly with his toe, thereby "breaking" the locked condition of the parts and permitting the latch spring to again project the latch rearwardly into active position.

17 designates a fore and aft extending plow beam or furrow opener support having applied to its opposite sides depending brackets 18 constituting in effect a bracket arm in which the central wrist portion of the arched axle 10 is loosely mounted, so that when the said arched portion is swung up and down in its bearings, the said beam will be moved up and down relatively to the machine frame as is usual in machines of this type. The plow beam has connected with its rear end a furrow opener in the form of a double mold board plow 19 and it carries also a sub-soiler 20 for forming the trench in which the seed is deposited, the said seed being covered in the present instance by disk coverers 21 traveling in rear of the sub-soiler, and the soil being pressed down on the seed by the press wheels 14 before alluded to.

The seed is directed into the trench by a vertical seed tube 22 sustained at its lower end by the rear end of the beam and extended at its upper end between the frame bars of the machine in position to receive the seed delivered by the seed discharging mechanism in the bottom of a seed can or hopper 23. The seed can is supported from the frame bars by a bracket or frame 24 firmly connected with the frame bars by means of the vertical standards 25, and a horizontal seed shaft 26 is mounted in suitable bearings in the frame 24 and in a standard 24ª extending upwardly from the frame bar 1. The shaft carries a vertical bevel pinion 27 which meshes with a horizontal bevel pinion 28 operatively connected with and driving the seed discharging mechanism.

The seed shaft receives its motion from the ground wheel 7 which has connected with it a sprocket wheel 29 which rotates with the ground wheel. A sprocket chain 30 passes around the sprocket wheel 29 and around a sprocket wheel 31 mounted loosely on the outer end of a horizontal countershaft 32, extending parallel with and in rear of the seed shaft and mounted in bearings in the standard 24ª before alluded to, and in an arm 33 extending upwardly from the frame bar 1, the said counter-shaft being adapted to operate the seed discharging mechanism through driving gearing presently to be described. The sprocket wheel 31 has fixed to its inner side a driving clutch member 31ª which is adapted, when the sprocket wheel is rotated in the advance of the machine, to make driving connection with a driven clutch member 31ᵇ fixed to the countershaft and drive the same, but which when rotated in the opposite direction is adapted to move outwardly on the shaft and disengage from the clutch member 31ᵇ, and thus rotate idly without affecting the counter-shaft. The wheel 31 is acted on at its outer side by a spiral spring 31ᶜ surrounding the outer end of the shaft and confined thereon by a head 31ᵈ on the end of the shaft, the tendency of the spring being to maintain the engagement of the two clutch members, while permitting the wheel to be moved against the pressure of the spring to disengage the clutch. By means of this clutch mechanism, the seed discharging mechanism will not be driven when the machine is backed; and it may be thrown out of action at the will of the driver during the advance of the machine, and also automatically when the plow is raised, as will be presently described.

The counter-shaft 32 has splined to it a spur pinion 34 and which may be shifted longitudinally of the shaft, which pinion is in constant mesh with a transmitting spur pinion 35 mounted loosely between parallel arms 36 of a lever 37. The forward ends of the arms of this lever are mounted loosely on the counter-shaft at opposite sides of the spur pinion 34, so that by shifting the lever horizontally the pinion 34 and transmitting pinion will be correspondingly shifted and the latter pinion brought opposite to any one of three driven pinions 38, 39 and 40 fixed on the seed shaft; and by rocking the lever 37 up and down on the axis of the shaft 32, the transmitting pinion may be caused to engage respectively with said driven pinions. The pinions 38, 39 and 40 are of different diameters in order to impart different speeds of rotation to the seed shaft, according to which particular one of the pinions is engaged by the transmitting pinion. When the lever is shifted and set to engage the transmitting pinion with the smaller pinion 38, the seed shaft will be driven at a higher rate of speed, and when engaged with the larger pinion 40 the shaft will be driven at a lower rate of speed, and when engaged with the pinion 39 the shaft will be driven at a moderate rate of speed. The mechanism described constitutes a changeable speed gearing for varying the action of the seed discharging mechanism in order that the seed deposited in the ground may be spaced at shorter or longer intervals according to the condition of the soil. The lever 37 is held in its different positions of adjustment so as to control the engagement of the transmitting pinion with one or the other of the pinions on the seed shaft, by means of a lug or nose 41 projecting upwardly therefrom and adapted to be engaged in any one of three notches 42, 43 and 44 of respectively different depths, in the lower edge of a member fixed relatively to the machine frame in the form of a casing 45 extending over and inclosing the three pinions. The notch 42 of the lesser depth is arranged opposite the larger pinion 40, and when the nose of the lever is engaged in this notch and lifted upwardly, with the nose engaging the upper wall of the notch, the transmitting pinion will be maintained in mesh with the larger pinion 40 and the motion of the ground wheel will be transmitted to the seed shaft through the sprocket wheel 31, spur pinion 34, transmitting pinion 35 and larger driven pinion 40 at a reduced speed. In changing to a higher speed the hand lever 37 is depressed to disengage its nose from the notch 42, which will disengage the transmitting pinion from the pinion 40, and the lever is then shifted horizontally and its nose brought opposite say the notch 44 of the greatest depth, and the lever being raised and the nose being drawn upward in said notch, the transmitting pinion will be engaged with the smaller pinion 38, and the motion of the ground wheel will be transmitted to the seed shaft at a greater speed. The lower edge of the casing between the several notches is formed with depressions 46 and 47 adapted to receive the nose on the lever and hold the transmitting pinion disengaged from either of the three pinions on the seed shaft, this position of the lever being for the purpose of disconnecting the seed shaft from its driving gearing and preventing the action of the seed discharging mechanism.

The seed discharging mechanism of the present machine is adapted for planting corn, and is of such form and construction as is well known in this art, that a given number of kernels is dropped periodically so as to plant the hills at predetermined intervals. By increasing the speed of the mechanism or decreasing the same, it will follow that the hills will be planted at lesser or greater intervals, as the case may be. The changeable speed mechanism which I have described provides for this variation and enables the hills to be planted closer together, where the soil is in good condition, and at greater intervals where the soil is poorer. My mechanism is not confined to the planting of the seed in hills in this manner, but is applicable as well in connection with seed discharging mechanism where the seed is "drilled" or planted continuously, the variation in the speed causing a greater or less amount of seed, as the case may be, to be deposited in the ground for a given distance of advance of the machine.

I propose to utilize the capability of the sprocket wheel 31 to shift on its shaft, to throw the seed discharging mechanism out of action automatically when the plow beam is lifted to raise the plow out of the ground. This is effected by means of a clutch operating member in the form of a sleeve 49 which loosely surrounds the clutch members 31ª and 31ᵇ before alluded to, and has its outer end arranged adjacent the inner side of the sprocket wheel 31. This sleeve is formed at its inner end with sloping teeth 50 which engage corresponding teeth 51 projecting outwardly from the bearing in the standard 24ª in which the counter-shaft is mounted. The sleeve 49 is both oscillatable and movable endwise on the clutch members, the relation and form of the teeth being such that when the sleeve is oscillated rearwardly, it will be forced outwardly, with the result that the outer end of the sleeve engaging the sprocket wheel, will push the same axially and disengage the driving clutch member 31ª thereon from the driven clutch member 31ᵇ on the counter-shaft, and the sprocket wheel will then revolve without imparting motion to the counter-shaft, and the operation of the seeding mechanism will be arrested. The sleeve 49 has projecting upwardly from it an arm 52, to the upper end of which is jointed the rear end of a link 53 which extends forwardly and is jointed at its forward end to an upright arm 54 of an elbow lever 55. This elbow lever is pivoted to the frame bar 1 on a horizontal transverse axis by the pivot bolt 56, and the horizontal arm 57 of the elbow lever projects forwardly and is provided with an inwardly extending finger 58 which extends above and in the path of the arch arm 10ª of the arched axle.

As a result of the foregoing construction, when the arched axle 10 is swung upwardly to raise the plow beam in the manner to be more fully described hereinafter, the arch arm 10ª will engage the finger 58 on the elbow lever and will rock said lever on its axis, which action will thrust the link 53 rearwardly and correspondingly swing the arm 52 in a like direction, thereby rotating the sleeve 49 and disengaging the clutch member on the sprocket wheel 31 from the clutch member on the counter-shaft.

In the event of its being desired to disengage the seed discharging mechanism independently of its automatic disengagement by the elevation of the beam, the driver may reach down and swing arm 52 to the rear by hand. The arm 52 is acted on by a spring 62 connected at its rear end to the arm and at its forward end to a gear casing 64 fixed to the machine frame and inclosing the driving sprocket chain and wheels, the tendency of the spring being to hold the sleeve 49 in its forward position with its outer end disengaged from the sprocket wheel and the latter in driving engagement with the counter-shaft.

The mechanism described constitutes a simple, durable and effectively operating means for controlling the operation of the seed discharging mechanism both automatically by the elevation of the plow beam, and manually by the driver, and by arranging the operating parts of this mechanism at a point remote from the ground wheel axis, the parts are well removed from the surface of the soil, thereby avoiding the liability of the operative mechanism becoming clogged with dirt and trash.

The plow beam and connected parts are adapted to be raised either manually by the driver, or automatically by the power of the machine in its advance through the field.

The elevation of the beam manually is controlled by a hand lever 65 which is pivoted between its ends as at 66 to a toothed segment frame 67 fixed to and extending upwardly from the frame bar 2, the said lever being provided below its pivotal axis with a downward extension 68, the purpose of which will presently appear. Fixed to and extending forwardly from the lever is a bracket arm 69 consisting of an upper strap 70 connected at its rear end with the lever at a point above the axis 66 as at 70ª, and a lower strap 71 connected at its rear end with the extension 68 of the lever below the axis as at 71ª, the forward ends of said straps being fastened together by means of a lateral finger 72 on the upper end of a link 13

73, which finger extends through holes in the ends of the two straps. The lower end of the link 73 is jointed to a plate 74 firmly clipped to the arch arm 10$^b$ of the arched axle, these parts joining the lever 65 to the beam support, constituting in effect a pivotal connection between the lever and beam support. As a result of this construction, when the lever 65 is pulled rearwardly from its forward position as shown in Fig. 1 to its rear position as shown in Fig. 2, the link 73 will be drawn upwardly and the arched portion of the arched axle will be swung upwardly about the axes of the ground wheels, thereby elevating the beam and raising the plow and connected parts out of action to an elevated position as shown in Fig. 2. The segment frame is provided with a series of forward notches 75 and with a single rear notch 76, which notches are adapted to be engaged by the lower end of a locking latch 77 mounted to slide in a lower guiding lug 77$^a$ and an upper guiding lug 77$^b$ on the hand lever. At its upper end the latch is coupled with a head in the form of an eye 78 on the lower end of a latch rod 78$^a$ which rod extends upwardly and is connected at its upper end with an operating handle 79 mounted on the hand lever. When the latch is engaged with one of the forward notches as shown in Fig. 1, the plow beam and connected parts will be held down with the plow in action, and when engaged with the rear notch 76, the plow beam and connected parts will be held in elevated position with the plow out of action as shown in Fig. 2. In the up and down movements of the beam it is guided and leveled by means of a link 80 jointed at its forward end as at 81 to the rear end of a bracket 82 fixed to the forward end of the machine frame, and jointed at its rear end to a bracket arm 83 extending upwardly from the plow beam and consisting of two straps 84 and 85 bolted at their lower ends to the plow beam and connected together at their upper ends by means of a lateral finger 86 on the link 80 extending through openings in the ends of the straps, this connection of the link with the straps forming in effect a pivotal connection between the frame and the plow beam. The form and relation of these parts is such that when the beam is in elevated position with the ground wheels and press wheels at the same level as shown in Fig. 2, the bottom of the plow will be in substantial parallelism with the surface of the ground, and when the beam is lowered the plow will assume a downward inclination at its point so as to readily penetrate the soil, and when the furrow has been opened and the press wheels descend to the floor thereof, the plow as it completes its descent and reaches its working depth, will take the position shown in Fig. 1 with its bottom parallel with the surface of the ground and bearing flatly on the furrow floor. These actions are brought about by the relations which the arch arms 10 bear to the link 80, the latter being, as shown in the several figures of the drawings, less in length than the arch arms. Due to this fact, the plow bottom will assume a horizontal level position when lowered into the ground, and this horizontal position will be maintained notwithstanding the increased depth to which it may be set for deeper furrows.

The link 80 is provided with a turn buckle 80$^a$ by means of which it may be lengthened or shortened, the effect of which will be to adjust the plow beam on its point of pivotal connection with the arched axle and thereby vary the angle of the plow point with reference to the surface of the ground. This capability of adjustment I consider of special advantage and importance, in that it enables the plow bottom to be set to properly take the ground without regard to the wear on the point occuring in use. Also it enables the angle of the plow to be varied according to the condition of the soil, a greater tip of the plow point downward being desired when working in hard ground than when working in softer ground.

The elevation of the beam and connected parts by power as before alluded to, is effected by the rotation of the ground wheel 8 as the machine is drawn through the field. For this purpose a friction clutch member 87 shown more particularly in Figs. 4, 6 and 7 is fixed to the inner side of the hub of the ground wheel so as to rotate therewith loosely about the horizontal axle arm 9. Coöperating with the clutch member 87 is a clutch drum 88 consisting of a hub portion 88$^a$ constituting a winding drum, and a friction rim 88$^b$ adapted when the drum is moved toward the clutch member, to frictionally engage therewith and be driven thereby, and when moved away from the clutch member to disengage therefrom and come to rest. A spiral spring 89 encircles the axle arm between the clutch member and the clutch drum and tends to urge the clutch drum away from the clutch member out of engagement therewith. The clutch drum rotates loosely on a cam sleeve 90 and against a peripheral shoulder 91 on the sleeve, which sleeve is mounted loosely on the horizontal axle arm and is provided on its inner edge with sloping cam surfaces 92 engaging corresponding sloping cam surfaces 92$^a$ projecting from the outer side of the bearing 12 in which the arched axle is supported at one side by the machine frame. The form and relation of the cam surfaces on the sleeve and the bearing are such that when the sleeve is turned rearwardly it will be thrust outwardly and acting on the clutch drum, the latter will be forced outwardly toward the clutch member and into driving engagement therewith, this action being against the influence of the spring 89 and acting to compress said spring; and when the cam sleeve is rotated in the reverse direction the spring 89 in reacting will push the clutch drum inwardly away from the clutch member out of engagement therewith. The cam sleeve 90 has projecting upwardly from it an actuating arm 93 which is operated to control the action of the cam sleeve in the manner presently to be described. A chain 94 has its forward end connected with the clutch drum so that it will be wound thereon in the rotation of the drum, and has its rear end connected with the lower end of the extension 68 of the lever 65 before alluded to, the result being that as the clutch drum is rotated when in driving engagement with the clutch member, the chain will be wound thereon and will pull the lower end of the lever forwardly and swing its upper end rearwardly, and due to the connection of the said lever with the arched axle through the medium of the bracket arm 69 and link 73 before described, the arched axle will be swung rearwardly and upwardly from the position shown in Fig. 1 to the position shown in Fig. 2 as previously described, by which action the plow beam and connected parts will be elevated out of the ground to an inoperative position as shown in Fig. 2.

The connection of the clutch drum with the clutch member to bring about the power elevation of the parts as just described, is effected by means of a horizontal fore and aft extending foot lever 95 pivoted between its ends as at 96 to the segment frame on the axis of the pivotal connection of the hand lever 65 with said frame, and having jointed to its forward end the rear end of a link 97, the forward end of which is jointed to the upper end of the clutch actuating arm 93. The construction and relation of the parts is such that when this foot lever is depressed, the cam sleeve 90 will be turned in a counter-clockwise direction and the clutch drum will be pushed outwardly into driving engagement with the clutch member, whereupon the rotation of the clutch member will be imparted to the clutch drum, the chain will be wound thereon and the plow beam and connected parts elevated. It is necessary before the parts can be thus elevated, to unlock the hand lever from the segment frame, and this unlocking is effected automatically by the depression of the foot lever, through the medium of a vertically movable lever 98 pivoted at its forward end to the segment frame as at 99 and extending rearwardly above the foot lever in such position that when the rear end of the foot lever is depressed its forward end will engage the lever 98 and move the same vertically. To the rear end of the lever 98 is jointed the lower end of a link 100 which has formed on its upper end a lateral eye 100ª encircling the upper end of the latch between the head 78 on the latch rod and the guiding lug 77ᵇ on the hand lever, the result being that when the lever 98 is moved vertically by the depression of the foot lever, the eye 100ª on the link 100 will engage the head 78 on the latch rod and will thrust the latch rod outwardly and thereby correspondingly move the latch and disengage the same from the forward notch in the segment frame in which it was for the time being entered. It is seen therefore that the effect of depressing the foot lever 95 is first to unlock the hand lever from the segment frame and thereby release the beam from its locked depressed position, and next to actuate the cam sleeve 90 and connect the clutch drum in driving engagement with the clutch member. In the lifting operation described, the latch after it is disengaged from the forward notch will, as the lever 65 swings rearwardly away from lever 98 toward the rear notch 76, ride upon the outer periphery of the segment frame until the notch 76 is reached, whereupon the latch will be projected into said notch by its spring. By this automatic engagement of the latch, the driver is given warning that the plow is fully raised and locked in that position, whereupon he releases the pressure of his foot on the foot lever and the latter will be swung upwardly to its former position by means of a spiral spring 101 connected at its rear end to the forward end of the foot lever and connected at its opposite end to a fixed arm 102 on the machine frame. The upward movement of the foot lever in this manner will thrust link 97 forwardly and turn the cam sleeve 90 in a like direction so that the clutch drum will be permitted to be disengaged from the clutch member by its spring 88.

It will be noted that in the foregoing operation the driver holds the foot lever down until the latch seats automatically in the rear notch. This lowered position of the foot lever does not interfere with the seating of the latch, because the lever 98, as the hand lever swings to the rear, is lifted slightly by the engagement of the lug 77ᵇ on the hand lever with the eye 100ª on the link 100, which engagement is due to the relation of the pivotal axis of the hand lever to the pivotal axis of lever 98, the result being that when the hand lever reaches its rear position ready for the seating of the latch in the rear notch, the eye 100ª on the link 100 will rest on lug 77ᵇ and out of engagement with the head 78 on the latch rod, and will not therefore interfere with the descent of the latch rod in the seating of the latch. The parts will thus be locked in their elevated positions and the clutch drum disengaged from the driving clutch member. When the plow is to be lowered, the hand lever is unlocked from its rear position by the release of the locking latch by operating the handle 79, whereupon the weight of the parts assisted by a spring A will cause them to descend.

I deem this capability of the latch to engage automatically in the rear notch, while the foot lever is still depressed, as of importance and advantage for the reason that the driver will be permitted to give his full attention to the guiding of the horses in making the turn at the ends of the field, without being concerned with the precise moment of the seating of the latch, as would otherwise be necessary if the seating of the latch were dependent upon the release of the foot lever. The foot lever is operated to effect the elevation of the furrow opener at the moment when the machine reaches the end of the field, and by the use of my improved construction the operator after having depressed the foot lever to initiate the action of the power elevating means, keeps the lever depressed until by the automatic seating of the latch as described, he is apprised of the fact that the parts are fully raised. In the meantime he is devoting his full attention to guiding the horses to make a complete and proper turn, and when he hears the click of the latch as it is seated by its spring, he can then release the foot lever so that the clutch members of the power mechanism will be disengaged.

Figure 15:
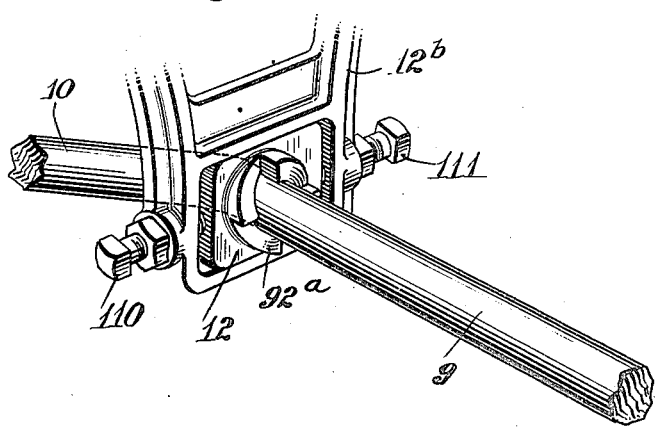
Fig. 15 is a fragmentary perspective view showing how the arched axle is mounted at one side in its bearing in the machine frame to permit of the relative adjustment of the frame to cause the press wheels to follow the furrow accurately.

In order that the machine frame may be adjusted laterally with reference to the furrow opener or plow, to the end that the press wheels may be caused to follow accurately in the line of the furrow, the bearing 12 in which the arched axle is mounted at one side is sustained by the machine frame in such manner that it may be adjusted relatively thereto in a fore and aft direction. This adjustment is effected as shown more particularly in Fig. 15, where it will be seen that the bearing is seated in a horizontal opening in the lower part of the depending hanger bracket 12$^b$, which opening is of such size that the bearing may be shifted horizontally in a fore and aft direction therein to a limited extent. The bearing at its front end is acted on by a front adjusting screw 110 screwed in the forward wall of the opening with its inner end engaging the forward end of the bearing, and at its rear end the bearing is acted on by a similar adjusting screw 111, threaded in the rear wall of the opening with its inner end engaging the rear end of the bearing. By loosening up the rear screw and tightening up the forward screw, the bearing will be shifted rearwardly with the result that the frame will be swung at its rear to the right and will carry the press wheels in corresponding direction; and when the forward screw is loosened up and the rear screw tightened up, the bearing will be shifted forwardly in the opposite direction, thereby swinging the rear end of the frame to the left. By this means the press wheels may be nicely adjusted and caused to follow the furrow accurately and thereby press the dirt evenly upon the planted seed.

In the foregoing description and accompanying drawings I have described my invention in the particular form and embodiment I prefer to adopt, which embodiment has been found in practice to answer to a satisfactory degree the objects in view. It will be manifest, however, that these details may be variously changed and modified by the skilled mechanic without departing from the limits of my invention; and it will be understood that the invention is not limited to any particular form or construction of the parts except in so far as such limitations are specified in the claims.

Having thus described my invention, what I claim is:

1. In an agricultural implement, the combination of a frame, ground wheels supporting the same, a furrow opener support sustained by the frame and movable up and down relatively thereto and carrying a furrow opener, a hand lever pivoted to a relatively fixed part of the frame and operatively connected with the furrow opener support for raising the same, said lever being provided below its pivotal axis with a downward extension, a locking latch on the hand lever adapted to coöperate with a relatively fixed part of the frame to lock the lever thereto, a winding drum adapted to be rotated by one of the ground wheels, a chain connected with the drum and with the extension on the hand lever, and means for controlling the rotation of the drum by the ground wheel, said means being operable to actuate the latch and release the lever from its locked position.

2. In an agricultural implement, the combination of a frame, ground wheels supporting the same at the front, a furrow opener support carrying a furrow opener, a hand lever pivoted to a relatively fixed part of the frame in rear of the ground wheels, operative connections between the lever and furrow opener support adapted when the lever is swung to the rear to raise the support, said lever being provided below its pivotal axis with a downward extension, a locking latch on the hand lever adapted to coöperate with a relatively fixed part of the frame to lock the lever thereto, a winding drum adapted to be rotated by one of the wheels, a chain connected to said drum and to said extension on the lever and adapted to be wound on the drum and draw the lower end of the lever forward when the drum is rotated, and means for controlling the rotation of the drum by the ground wheel, said means being operable to actuate the latch and release the lever from its locked position.

3. In an agricultural implement, the combination of a frame, a furrow opener support sustained by the frame and movable up and down relatively thereto and carrying a furrow opener, a hand lever pivoted to the frame and operatively connected with the support for raising the same, a locking latch on the hand lever adapted to engage a relatively fixed part of the frame and lock the furrow opener support down, a latch releasing lever pivoted to a relatively fixed part of the frame and operatively connected with the latch, a foot lever pivoted to a relatively fixed part of the frame beneath the latch releasing lever and disconnected therefrom and adapted when operated to engage the latter and release the latch, power mechanism operated by the advance of the machine and operatively connected with the hand lever, and a controlling device for the power mechanism connected with the foot lever.

4. In an agricultural implement, the combination of a frame, ground wheels sustaining the same, a furrow opener support sustained by the frame and movable up and down relatively thereto and carrying a furrow opener, a segment frame on the machine frame, a hand lever pivoted to the segment frame and operatively connected with the furrow opener support for raising the same, power mechanism operated by the advance of the machine and operatively connected with the hand lever for operating it by power, a foot lever pivoted to the segment frame on an axis coincident with the axis of the hand lever, a device for controlling the operation of the power mechanism, connections between said device and the foot lever, a locking latch on the hand lever adapted to engage the segment frame and lock the furrow opener support down, a latch releasing lever pivoted to the segment frame above the foot lever and extending in the path of movement of the latter, and a link connecting said latch releasing lever with the locking latch.

5. In an agricultural implement, the combination of a frame, an arched axle comprising arch arms a connecting wrist portion and axle arms, the said axle arms being mounted to rock in bearings in the frame, ground wheels on the axle arms, a plow beam pivoted to the wrist portion of the arched axle to move up and down in the rocking motions of the same, an operating lever pivoted to a relatively fixed part of the frame and operatively connected with the arched axle to rock the same, a bracket extending upwardly from the plow beam, and a link pivoted at its rear end to said bracket at a point substantially vertically above the wrist portion of the axle when the beam is in raised position, and pivoted at its front end to the frame of the machine, said link being less in length than the length of the arch arms.

6. In an agricultural implement, the combination of a frame, ground wheels supporting the same, a plow beam provided with a plow, a sustaining member for the plow beam pivoted thereto and mounted on the machine frame to swing up and down, a lever pivoted between its ends to a relatively fixed part of the frame, a bracket arm extending forwardly from the lever, a link jointed to the bracket arm and to the beam sustaining member, a second link jointed to the beam and to the frame, a winding drum adapted to be operated by one of the ground wheels, a chain connecting the drum with the lever at a point below its pivotal axis, and means for controlling the operation of the drum.

7. In an agricultural implement, the combination of a frame, an arched axle comprising arch arms, a wrist portion connecting said arms, and axle arms extending outwardly from the arch arms, said axle arms being mounted in bearings in the machine frame, ground wheels rotatably mounted on the axle arms, a plow beam carrying a plow and provided with a downwardly extending bracket arm loosely mounted on the wrist portion of the arched axle, a hand lever pivoted to a relatively fixed part of the frame in rear of the arched axle, a bracket arm extending forwardly therefrom, a link jointed at one end to the bracket arm and pivoted at its other end to one of the arch arms adjacent the junction of the latter with the wrist portion of the arched axle, a bracket arm extending upwardly from the beam adjacent the first mentioned bracket arm, and a forwardly extending link pivoted at its rear end to said upwardly extending bracket arm and pivoted at its forward end to the machine frame.

8. In an agricultural implement, the combination of a frame, a furrow opener support movable up and down relatively thereto, power means for raising the furrow opener support, a locking device adapted to engage said relatively fixed portion of the frame and hold the support respectively in its lowered and elevated positions, and a foot lever adapted when depressed to release the locking device and throw the power mechanism into action, said parts being formed and constructed to cause the locking device to automatically engage the frame and lock the support elevated while the foot lever is held depressed.

9. In an agricultural implement, the combination of a frame, a furrow opener support sustained thereby and movable up and down relatively thereto, a lever pivoted to a relatively fixed part of the frame and operatively connected with the furrow opener support to raise the same, a locking latch on the lever adapted to engage the frame when the lever is in its different positions to hold the support respectively in its lowered and raised positions, power mechanism adapted to be operated by one of the ground wheels and operatively connected with the lever to swing the same, a controlling device for said power mechanism to throw the same into action, and a foot lever on the frame operatively connected with the controlling device to actuate the same when the lever is depressed, said lever being operatively connected also with the locking latch to release it when the foot lever is depressed, whereby the said lever will be swung and the furrow opener support elevated, said parts being formed and constructed to cause the locking latch to automatically re-engage the frame while the foot lever remains depressed and thereby lock the parts in position with the furrow opener support raised.

10. In an agricultural implement, the combination of a frame, ground wheels supporting the same, a furrow opener support sustained by the frame and movable up and down relatively thereto and carrying a furrow opener, a segment frame on the machine frame, a lever pivoted to the segment frame and operatively connected with the furrow opener support to raise the same, a locking latch on the lever, adapted to engage the segment frame when the lever is in one position and lock the furrow opener support down, power mechanism adapted to be operated by one of the ground wheels and operatively connected with the lever for raising the furrow opener support, a controlling device for said power mechanism, a foot lever pivoted to the segment frame and operatively connected with the controlling device to throw the power into action upon being depressed, a member operatively connected with said latch and adapted to be operated by the foot lever to disengage the latch and release the lever to permit it to be swung to another position by the power mechanism to raise the furrow opener support, said member operating when the lever is thus swung, to cause the latch to automatically engage the segment frame and hold the parts in elevated position while the foot lever is in depressed position.

11. In an agricultural implement, the combination of a machine frame, a furrow opener support movable up and down relatively thereto, a segment frame on the machine frame provided with front and rear notches, a lever pivoted to the segment frame and operatively connected with the furrow opener support for raising the same when said lever is swung to the rear, said lever having a lug, a spring actuated latch on the lever adapted to engage said notches in the segment frame when the lever is in its forward and rear positions respectively, a latch rod having a head above said lug coupled with the latch, a lever pivoted at its forward end to the segment frame and extending rearwardly, a link pivoted at its lower end to said last named lever and having an eye on its upper end encircling the latch between the lug and head on the latch rod, a foot lever pivoted to the segment frame and adapted when depressed to elevate the last mentioned lever and release the latch, and a power mechanism operatively connected with the first mentioned lever for operating the same and adapted to be thrown into action when the foot lever is depressed; whereby the latch will be automatically engaged with the rear notch in the segment frame while the foot lever is still depressed.

12. In an agricultural implement, the combination of a frame, ground wheels supporting the same, a swinging beam support mounted on the frame, and movable up and down relatively thereto, a plow beam pivoted to the beam support to move up and down therewith, a lever movably mounted on the frame, a pivotal connection between the lever and beam support, a winding drum adapted to be rotated by one of the ground wheels, a chain connecting the drum and lever, and a latch on the lever adapted to lock the same in different positions relative to the frame.

13. In an agricultural implement, the combination of a frame, ground wheels supporting the same, a swinging beam support mounted on the frame and movable up and down relatively thereto, a plow beam pivoted to said support and movable up and down with it, a lever pivoted between its ends on the frame, a pivotal connection between the lever and beam support, a winding drum adapted to be rotated by one of the ground wheels, a chain connecting the drum with the lever at a point below the axis of the same, and means for locking the lever in different fixed positions relative to the frame.

14. In an agricultural implement, the combination of a frame, ground wheels supporting the same, a swinging beam support mounted on the frame and movable up and down relatively to the same, a plow beam having a depending bracket pivotally connected with the beam support, a lever pivoted to the frame, a link connecting the lever with the beam support adjacent the pivotal connection of the latter with the bracket, a winding drum adapted to be rotated by one of the ground wheels, a chain connecting the drum with the lower end of the lever, a bracket on the plow beam extending upwardly therefrom at a point opposite the said depending bracket, a link connecting the upwardly extending bracket with the machine frame, and means for locking the lever in different fixed positions relative to the frame.

15. In an agricultural implement, the combination of a frame, ground wheels supporting the same, a beam support mounted on the frame and movable up and down relatively thereto, a plow beam carried by said support to move up and down with it, a member movably mounted on the frame and operatively connected with the beam support for moving it, means for locking said member in different positions relatively to the frame, a winding drum adapted to be rotated by one of the ground wheels, a chain connected with the drum and movable member respectively, and means for controlling the operation of the drum by the ground wheel.

16. In an agricultural implement, the combination of a frame, an arched axle mounted to rock therein, sustaining ground wheels rotatably mounted on the ends of the axle, a plow beam pivoted on the arched portion of the axle and adapted to be moved up and down in the rocking motions of the axle, a member movably mounted on the frame and operatively connected with the axle to rock the same, means for locking said member in different positions relatively to the frame, a winding drum operated from one of the ground wheels, a chain connected to the movable member and drum respectively, and adapted to be wound on the latter, and means for controlling the operation of the drum by the ground wheel.

17. In an agricultural implement, the combination of a frame, ground wheels supporting the same, a plow beam mounted on the frame and movable up and down out of and into action respectively, a movable member mounted on the frame and operatively connected with the beam for moving it, a locking latch on the movable member coöperating with the frame to lock the beam down in action and up out of action respectively, a power mechanism operated by one of the ground wheels and operatively connected with the movable member for moving the same to raise the beam, a foot lever mounted on the frame and operable to actuate the locking latch and release the movable member from its locked position with the beam down, and operable also to throw the power mechanism into operation, and a manually operable means for actuating the locking latch to release the movable member from its locked position with the beam elevated, the form and relation of the parts being such that when the movable member is locked by the latch with the beam elevated, the foot lever will be ineffective to actuate the latch.

In testimony whereof, I have affixed my signature.

HARRY S. DICKINSON.